United States Patent
Mayer et al.

(10) Patent No.: US 12,286,530 B2
(45) Date of Patent: Apr. 29, 2025

(54) TOUGHENED TWO-COMPONENT EPOXY COMPOSITION

(71) Applicant: SIKA TECHNOLOGY AG, Baar (CH)

(72) Inventors: Christoph Mayer, Feusisberg (CH); Tobias Meier, Dietikon (CH)

(73) Assignee: SIKA TECHNOLOGY AG, Baar (CH)

( * ) Notice: Subject to any disclaimer, the term of this patent is extended or adjusted under 35 U.S.C. 154(b) by 706 days.

(21) Appl. No.: 17/616,509

(22) PCT Filed: Jun. 12, 2020

(86) PCT No.: PCT/EP2020/066319
§ 371 (c)(1),
(2) Date: Dec. 3, 2021

(87) PCT Pub. No.: WO2020/249741
PCT Pub. Date: Dec. 17, 2020

(65) Prior Publication Data
US 2022/0227991 A1 Jul. 21, 2022

(30) Foreign Application Priority Data
Jun. 14, 2019 (EP) .................................... 19180327

(51) Int. Cl.
*C08L 63/00* (2006.01)
*C08G 18/10* (2006.01)
*C08G 18/48* (2006.01)
*C08G 18/75* (2006.01)
*C08G 18/76* (2006.01)
*C09J 163/00* (2006.01)

(52) U.S. Cl.
CPC .............. *C08L 63/00* (2013.01); *C08G 18/10* (2013.01); *C08G 18/4825* (2013.01); *C08G 18/755* (2013.01); *C08G 18/7671* (2013.01); *C09J 163/00* (2013.01); *C09J 2463/00* (2013.01); *C09J 2475/00* (2013.01)

(58) Field of Classification Search
CPC ........ C09J 163/00; C08L 63/00; C08G 18/10; C08G 18/76; C08G 18/75; C08G 18/48
USPC ........................................................ 524/408
See application file for complete search history.

(56) References Cited

U.S. PATENT DOCUMENTS

| | | | | |
|---|---|---|---|---|
| 9,296,931 B2* | 3/2016 | Frick | ........................ | C08L 63/00 |
| 2010/0130655 A1* | 5/2010 | Agarwal | .............. | C08G 59/182 |
| | | | | 525/122 |
| 2013/0230726 A1* | 9/2013 | Frick | ........................ | C08L 63/00 |
| | | | | 156/330 |
| 2016/0272750 A1* | 9/2016 | Voci | ........................ | C08G 18/12 |

FOREIGN PATENT DOCUMENTS

| | | | | |
|---|---|---|---|---|
| EP | 0338985 A2 | 10/1989 | | |
| EP | 1916269 A1 | 4/2008 | | |
| EP | 1916270 A1 | 4/2008 | | |
| EP | 1916272 A1 | 4/2008 | | |
| EP | 1972646 A1 | 9/2008 | | |
| EP | 2110397 A1 | 10/2009 | | |
| EP | 2128182 A1 | 12/2009 | | |
| EP | 2145924 A1 | 1/2010 | | |
| EP | 2365046 A1 | 9/2011 | | |
| EP | 3064518 A1 | 9/2016 | | |
| WO | 03/093387 A1 | 11/2003 | | |
| WO | 2004/055092 A1 | 7/2004 | | |
| WO | 2005/007720 A1 | 1/2005 | | |
| WO | 2005/007766 A1 | 1/2005 | | |
| WO | WO-2017017089 A1 * | 2/2017 | ............. | B29B 7/726 |
| WO | 2017/044359 A1 | 3/2017 | | |

OTHER PUBLICATIONS

Jul. 2, 2020 International Search Report issued in Patent Application No. PCT/EP2020/066319.
Dec. 14, 2021 International Preliminary Report on Patentability issued in Patent Application No. PCT/EP2020/066319.

* cited by examiner

*Primary Examiner* — Deve V Hall
(74) *Attorney, Agent, or Firm* — Oliff PLC

(57) ABSTRACT

A two-component epoxy resin composition includes a first component K1 including at least one epoxy resin A that contains on average more than one epoxy group per molecule; and a second component K2 including a hardener B for epoxy resins; wherein the two-component epoxy resin composition contains between 2 and 35 wt.-%, based on the total weight of the composition, of at least one impact modifier I in either one or both of components K1 and K2; wherein the impact modifier I is a reaction product of at least one polymeric diol, at least one polyisocyanate, and cardanol. The two-component epoxy resin composition exhibits excellent toughness and impact peel strength.

11 Claims, No Drawings

TOUGHENED TWO-COMPONENT EPOXY COMPOSITION

TECHNICAL FIELD

The present invention relates to the field of two-component epoxy resin compositions, in particular suitable as adhesives.

PRIOR ART

Epoxy-based adhesive play an important role in industrial bonding, for example assembly of structural elements or composite bonding. Epoxy-based adhesives are generally inexpensive, possess very favorable adhesion properties on many substrates such as metal and fibrous materials and exhibit high cohesive and adhesive strengths. Such epoxy-based adhesives are often formulated in a two-component manner, whereby in a first component the epoxy resin is contained, and in a second component the hardeners for said epoxy resin, often amines, are contained. By separating these reactive species in separate packages, highly storage-stable compositions are obtained that cure rapidly when the two components are mixed together before application of the epoxy-based adhesive. This approach furthermore allows for highly reactive, fast curing systems that are curable at room temperature and that could not be formulated with these properties in a one-component approach due to storage stability limitations. Especially in industrial applications, a fast curing rate and fast strength build-up is often a prerequisite for any given application.

Epoxy resin compositions in their most basic form, i.e. consisting of an epoxy resin and a hardener, generally have high mechanical strengths but are very brittle, and this means that when the cured epoxy resin is subject to an impact force, for example one arising from a collision or strong vibration, it fractures, and the bond is therefore destroyed.

To address this issue, epoxy-based adhesives often contain impact modifiers, also called impact-strength modifiers or tougheners.

Impact modifiers have a long history of use for improving the strength of adhesives subject to impact forces.

Liquid rubbers, for example, have a relatively long history of use as tougheners. Examples of liquid rubbers used are those based on acrylonitrile/butadiene copolymers, examples being obtainable under the trade name Hycar®.

EP B 0 338 985 describes impact-resistant epoxy resin compositions which comprise not only liquid rubbers based on acrylonitrile/butadiene copolymers but also liquid rubbers based on polyurethane prepolymers, where these have capping by a phenol or by a lactam.

WO A 2005/007766 discloses impact-resistant epoxy resin compositions which comprise a reaction product of a prepolymer capped by isocyanate groups and of a capping agent selected from the group of bisphenol, phenol, benzyl alcohol, aminophenol, or benzylamine.

WO A 03/093387 discloses impact-resistant epoxy resin compositions which comprise adducts of dicarboxylic acids with glycidyl ethers, or of bis(aminophenyl) sulfone isomers, or of aromatic alcohols, with glycidyl ethers.

EP 1 972 646 A1 discloses impact-resistant epoxy resin compositions comprising epoxy group-terminated polyurethane polymers wherein first a prepolymer is prepared from a di-/tri-isocyanate, a polymer polyol and an alkoxylated bisphenol, and this is then reacted with an epoxy compound containing a primary or secondary hydroxyl group.

WO A 2004/055092 and WO A 2005/007720 disclose epoxy resin compositions with improved impact resistance, which comprise a reaction product of a polyurethane prepolymer terminated by isocyanate groups with a low-molecular weight monohydroxyepoxide. These epoxy resin compositions have improved low-temperature impact resistance when compared with those comprising phenol-terminated polyurethane prepolymers, but are still not ideal.

All of these abovementioned impact modifiers are high-viscosity substances, and this is disadvantageous for the production of certain formulations. Specifically, the addition of high-viscosity liquids is feasible only with increased costs when used to improve the toughness of solid epoxy systems, mostly achieved by methods involving formulation in extruders.

There is therefore a need for an easily prepared impact modifier that does not increase the viscosity of the epoxy adhesive significantly when used in effective amounts but still imparts a toughness that is superior to most known impact-strength modified epoxy systems. Additionally, it is desirable to have such a two-component epoxy composition with the above mentioned improved impact strength and toughness that however can be cured at room temperature.

DISCLOSURE OF THE INVENTION

Accordingly, it is the object of the present invention to provide a two-component epoxy resin composition with excellent impact peel strength and toughness, but at the same time exhibiting a low viscosity and achieving this by using inexpensive, readily available raw materials for the impact modifiers contained therein.

Surprisingly, it was found that by using novel impact modifiers based on polymeric diols, polyisocyanates, and cardanol, highly toughened and low viscous two-component epoxy compositions suitable as high strength adhesives can be obtained. The impact modifiers according to the present invention increase impact peel strength so efficiently, that already very low amounts suffice for a significant toughening and the viscosity increase of the composition is very moderate.

The invention relates in a first aspect to a two-component epoxy resin composition, consisting of
  a first component K1 comprising at least one epoxy resin A that contains on average more than one epoxy group per molecule; and
  a second component K2 comprising a hardener B for epoxy resins;
  wherein the two-component epoxy resin composition contains between 2 and 35 wt.-%, preferably between 3 and 25 wt.-%, in particular between 5 and 15 wt.-%, based on the total weight of the composition composition, of at least one impact modifier I in either one or both of components K1 and K2;
  characterized In that said impact modifier I is a reaction product of at least one polymeric diol, at least one polyisocyanate, and cardanol.

Other aspects of the present invention are the subject matter of additional independent claims. Especially preferred embodiments are the subject matter of the dependent claims.

WAYS OF CARRYING OUT THE INVENTION

The term "polymer" as used in the present document, on the one hand, refers to a collective of chemically uniform macromolecules prepared by a polyreaction (polymerization, polyaddition, polycondensation) where, however, the macromolecules differ with respect to their degree of polymerization, molecular weight and chain length. On the other hand, the term also comprises derivatives of said collective of macromolecules resulting from polyreactions, that is, compounds which were obtained by reactions such as, e.g., additions or substitutions, of functional groups in predetermined macromolecules and which may be chemically uniform or chemically non-uniform. Moreover, the term also comprises so-called prepolymers, that is, reactive organic pre-adducts, the functional groups of which participate in the formation of macromolecules.

The term "polymeric diol" describes a polymer having, at least on average, two hydroxyl groups, typically at the polymer chain ends.

The prefix "poly" in substance names such as "polyol", "polyisocyanate", "polyether" or "polyamine" in the present document means that the respective substance formally contains more than one of the functional group present in its name per molecule.

"Molecular weight" or, synonymously, "molar mass" is defined in the present document as the molar mass (in grams per mole) of a molecule. The "average molecular weight" or "average molar mass" is the term used for the average molar mass $M_n$ of an oligomeric or polymeric mixture of molecules, which is usually determined by GPC against polystyrene as standard.

"Primary hydroxyl group" is the term applied to an OH group bonded to a C-Atom with two hydrogens.

"Impact modifier" or "impact strength modifier" in this document means an additive to an epoxy resin matrix that, even for small additions, for example additions of 1-15% by weight, causes a definite increase in toughness of the cured matrix, and thus higher bending, tensile, shock, or impact stresses can be withstood before the matrix cracks or fractures. Typically, the impact peel strength according to ISO 11343 is used as a measure of the impact strength. Here, the fracture energy (BE) is indicated as the area under the measurement curve (from 25% to 90%, according to ISO 11343). Typically, the impact peel strength according to ISO 11343 can be used as another measure of the impact strength.

The term "elastic Modulus" refers, if not otherwise specified, to the modulus of elasticity (in the elongation range of 0.05-0.25%) as measured according to DIN EN ISO 527.

"Open time" is the term used in this document for the time within which the parts to be bonded must be fitted together after the components are mixed.

The term "strength" in the present document refers to the strength of the cured adhesive, wherein strength especially refers to the tensile strength and the modulus of elasticity (E-modulus), especially in the elongation range of 0.05 to 0.25%.

"Room temperature" in the present document means a temperature of 23° C.

In this document, the use of the term "independently of one another" in connection with substituents, moieties or groups should be interpreted such that substituents, moieties or groups with the same designation may be present simultaneously in the same molecule with different definitions.

The term "room temperature" ("RT") refers to a temperature of 23° C., if not otherwise specified.

All industrial standards and norms cited refer to the most recent versions at the time of first filing of this patent application, if not otherwise specified.

The terms "weight" refers in this document to the mass of a compound or composition as measured in kilograms.

The two-component epoxy resin composition consists of two components. The first component K1, the resin component, contains all epoxy-functional compounds.

The second component K2, the hardener component, contains chemical species that are able to react with epoxies under formation of a cross-linked or chemically cured product. In most cases, these hardener compounds are amines.

Components K1 and K2 are mixed together before or during application, which starts the cross-linking or curing reactions and ultimately yields a cured, hardened product.

The two-component epoxy resin composition contains a first component K1 comprising least one epoxy resin A that contains on average more than one epoxy group per molecule. Preferably, the amount of said epoxy resin A in the two-component composition is between 5 and 85 wt.-%, in particular between 25 and 65 wt.-%, preferably between 35 and 55 wt.-%, based on the total weight of the two-component composition.

Within component K1, said epoxy resin A is preferably contained in an amount of between 10 and 90 wt.-%, in particular between 35 and 85 wt.-%, preferably between 45 and 80 wt.-%, based on the total weight of component K1.

The epoxy resin A contained in the first component K1 of the two-component composition may be any conventional di- or multifunctional epoxy resin used in this field. Suitable epoxy resins are available e.g. from the reaction of an epoxide compound such as e.g. epichlorohydrin with a polyfunctional aliphatic or aromatic alcohol, i.e. a diol, triol or polyol. One or more epoxy resins may be used.

The epoxy resin A that contains on average more than one epoxy group per molecule is preferably a liquid epoxy resin and/or a solid epoxy resin.

The term "solid epoxy resin" is very well known to a person skilled in the art of epoxides and is used in contrast to "liquid epoxy resins". The glass transition temperature of solid resins is above room temperature, i.e. they can be comminuted to free-flowing powders at room temperature.

Suitable as an epoxy liquid resin or solid epoxy resin is in particular a diglycidyl ether, e.g. of the formula (I)

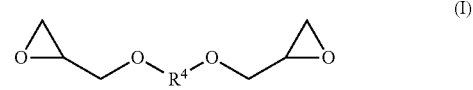

(I)

wherein $R^4$ is a divalent aliphatic or mononuclear aromatic or a dinuclear aromatic residue.

Examples of such diglycidyl ethers are in particular diglycidyl ethers of difunctional saturated or unsaturated, branched or unbranched, cyclic or open-chain $C_2$-$C_{30}$ alcohols, such as e.g. ethylene glycol, butanediol, hexanediol, or octanediol glycidyl ether, cyclohexane dimethanol diglycidyl ether, neopentyl glycol diglycidyl ether;

Diglycidyl ethers of difunctional, low to high molecular weight polyether polyols, e.g. polyethylene glycol diglycidyl ether, polypropyleneglycol diglycidyl ether;

Diglycidyl ethers of difunctional diphenols and optionally triphenols, which are understood not only pure phenols, but optionally also substituted phenols.

The type of substitution can be very diverse. In particular, this is understood to mean a substitution directly on the aromatic nucleus to which the phenolic OH group is bonded. In addition, phenols are understood to mean not only mononuclear aromatics but also polynuclear or condensed aromatics or heteroaromatics which have the phenolic OH group directly on the aromatic or heteroaromatic compounds. As bisphenols and, optionally, triphenols, 1,4-dihydroxybenzene, 1,3-dihydroxybenzene, 1,2-dihydroxybenzene, 1,3-dihydroxytoluene, 3,5-dihydroxybenzoate, 2,2-bis (4-hydroxyphenyl) are, for example, suitable. propane (=bisphenol-A), bis (4-hydroxyphenyl) methane (=bisphenol-F), bis (4-hydroxyphenyl) sulfone (=bisphenol-S), naphthoresorcinol, dihydroxynaphthalene, dihydroxyanthraquinone, dihydroxy-biphenyl, 3,3-Bis (p-hydroxyphenyl) phthalide, 5,5-bis (4-hydroxy-phenyl) hexahydro-4,7-methanoindane, phenolphthalein, fluorescein, 4,4'-[bis (hydroxyphenyl)-1,3-phenylenebis (1-methyl-ethylidene)] (=bisphenol-M), 4,4'-[bis (hydroxyphenyl)-1,4-phenylenebis (1-methyl-ethylidene)] (=bisphenol-P), 2,2'-diallyl-bisphenol-A, diphenols and dicresols prepared by reacting phenols or cresols with diisopropylidenbenzene, phloroglucin, bile acid esters, phenol or cresol novolaks with —OH functionality of 2.0 to 3.5 and all isomers the aforementioned compounds.

Preferred solid epoxy resins A have the formula (II)

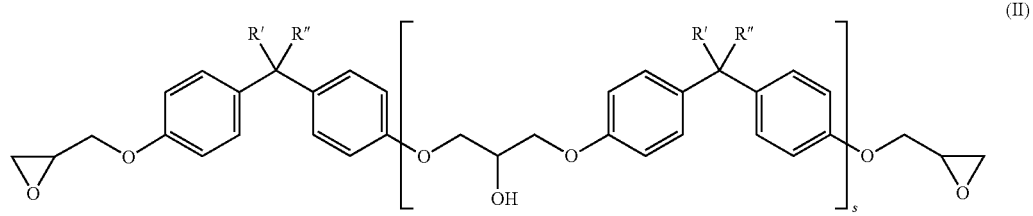

(II)

In this formula, the substituents R' and R" are each independently H or CH$_3$. In addition, the index s has a value of >1.5, in particular of 2 to 12.

Such solid epoxy resins are commercially available, for example from Dow, Huntsman or Hexion.

Compounds of the formula (II) with an index s between 1 and 1.5 are referred to by a person skilled in the art as semisolid epoxy resins. For this present invention, they are likewise considered to be solid resins. However, preferred are epoxy resins in the narrower sense, i.e. the index s has a value of >1.5.

Preferred liquid epoxy resins A have the formula (III)

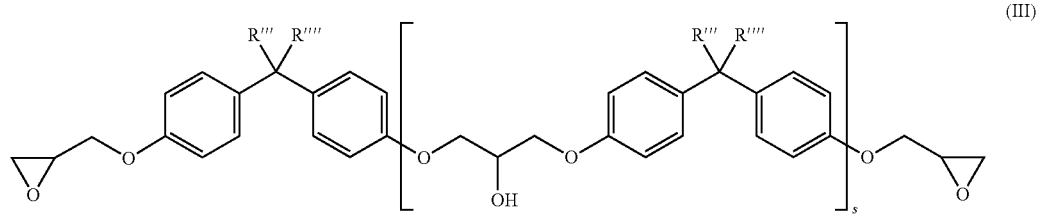

(III)

In this formula, the substituents R''' and R'''' are each independently H or CH$_3$. In addition, the index r has a value of 0 to 1. Preferably, r has a value of less than 0.2.

These are thus preferably diglycidyl ethers of bisphenol A (DGEBA), of bisphenol F and of bisphenol A/F (here, the designation "A/F" refers to a mixture of acetone with formaldehyde which is used as the reactant in the preparation thereof). Such liquid resins are available, for example, as Araldite® GY 250, Araldite® PY 304, Araldite® GY 282 (Huntsman), or D.E.R.™ 331, or D.E.R.™ 330 (Olin), or Epikote 828 (Hexion).

Moreover, so-called novolacs are suitable epoxy resins A. These have in particular the following formula:

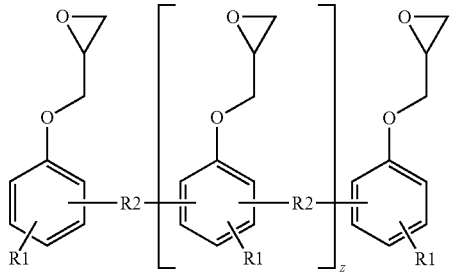

with R2=

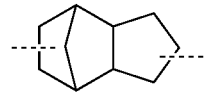

or CH$_2$, R1=H or methyl and z=0 to 7.

In particular, they are phenol or cresol novolacs (R2=CH$_2$).

Such epoxy resins are commercially available under the trade names EPN or ECN as well as Tactix® 556 from Huntsman or under the product line D.E.N.™ from Dow Chemical.

Preferably, the epoxy resin A is a liquid epoxy resin of the formula (III). In an even more preferred embodiment, the heat-curing epoxy resin composition contains at least one liquid epoxy resin of formula (III) as well as at least one solid epoxy resin of formula (II).

Particular preference is given to bisphenol A diglycidyl ether, bisphenol F diglycidyl ether or bisphenol A/F diglycidyl ether, in particular Araldite® GY 240, Aralite® GY 250, Araldite® GY 281, Araldite® GY 282, Araldite® GY 285, Araldite® PY 304 or Araldite® PY 720 (all from Huntsman), or D.E.R.® 330, D.E.R.® 331, D.E.R.® 332, D.E.R.® 336, D.E.R.® 351, D.E.R.® 352, D.E.R.® 354 or D.E.R.® 356 (all from Olin), or novolak glycidyl ether.

Preferred is a novolak glycidyl ether that is derived from phenol-formaldehyde novolaks, which are also referred to as epoxy phenol novolac resins.

Such novolac glycidyl ethers are commercially available, for example from Olin, Huntsman, Momentive or Emerald Performance Materials. Preferred types are D.E.N.® 431, D.E.N.® 438 or D.E.N.® 439 (from Olin), Araldite® EPN 1179, Araldite® EPN 1180, Araldite® EPN 1182 or Araldite® EPN 1183 (from Huntsman), Epon® 154, Epon® 160 or Epon® 161 (from Momentive) or Epalloy® 8250, Epalloy® 8330 or Epalloy® 8350 (from Emerald Performance Materials).

Additionally, mono-, di- and multifunctional reactive diluents (e.g. butanediol diglycidylether) may be comprised in component K1 of the composition.

These reactive diluents are in particular:
- glycidyl ethers of monofunctional saturated or unsaturated, branched or unbranched, cyclic or open-chain $C_4$-$C_{30}$ alcohols, in particular selected from the group consisting of butanol glycidyl ether, hexanol glycidyl ether, 2-ethylhexanol glycidyl ether, allyl glycidyl ether, tetrahydrofurfuryl and furfuryl glycidyl ether, trimethoxysilyl glycidyl ether.
- glycidyl ethers of difunctional saturated or unsaturated, branched or unbranched, cyclic or open-chain $C_2$-$C_{30}$ alcohols, in particular selected from the group consisting of ethylene glycol, butanediol, hexanediol, or octanediol glycidyl ethers, cyclohexane dimethanol diglycidyl ether and neopentyl glycol diglycidyl ether,
- glycidyl ethers of tri- or polyfunctional, saturated or unsaturated, branched or unbranched, cyclic or open-chain alcohols, such as epoxidized castor oil, epoxidized trimethylolpropane, epoxidized pentaerythritol or polyglycidyl ethers of aliphatic polyols such as sorbitol, glycerol or trimethylol propane.
- glycidyl ethers of phenol and aniline compounds, in particular selected from the group consisting of phenyl glycidyl ether, cresyl glycidyl ether, p-tert-butyl-phenyl glycidyl ether, nonylphenol glycidyl ether, 3-n-pentadecenyl glycidyl ether (from cashew nut shell oil), N,N-diglycidyl aniline and triglycidyl of p-aminophenol.
- epoxidized amines such as N,N-diglycidyl cyclohexylamine.
- epoxidized mono- or dicarboxylic acids, in particular selected from the group consisting of glycidyl neodecanoate, glycidyl methacrylate, glycidyl benzoate, diglycidyl phthalate, tetra- and hexahydrophthalate and diglycidyl esters of dimeric fatty acids and diglycidyl esters of terephthalic acid and trimellitic acid.
- epoxidized di- or trifunctional, low to high molecular weight polyether polyols, in particular polyethylene glycol diglycidyl ether or polypropylene glycol diglycidyl ether.

Particularly preferred are hexanediol diglycidyl ether, cresyl glycidyl ether, p-tert-butylphenyl glycidyl ether, polypropylene glycol diglycidyl ether and polyethylene glycol diglycidyl ether.

Advantageously, the total proportion of the reactive diluent is from 0.1 to 20% by weight, preferably from 1 to 8% by weight, based on the weight of the total two-component composition.

The two-component epoxy resin composition contains a second component K2 preferably comprising between 5 and 40 wt.-%, more preferably between 6 and 35 wt.-%, in particular between 7 and 30 wt.-%, most preferably between 10 and 25 wt.-%, based on the total weight of the two-component composition, of a hardener B for epoxy resins.

Within component K2, said hardener B is preferably contained in an amount of between 10 and 100 wt.-%, more preferably between 15 and 80 wt.-%, in particular between 20 and 75 wt.-%, most preferably between 30 and 70 wt.-%, based on the total weight of component K2.

Hardener B may be any hardener suitable for epoxy resins, including aliphatic polyamines, aromatic polyamines, polyamino-functional amine-epoxy adducts, ketimines, polyamide resins, polymercaptanes, anhydrides, and latent amines such as dicyandiamide.

Hardener B is preferably a compound or a mixture of compounds selected from the group consisting of poly (ethyleneimines), polyamidoamines, amino group terminated butadiene/acrylonitrile copolymers, and polyamines.

Examples of suitable hardeners B include, for example
- aliphatic, cycloaliphatic or arylaliphatic primary diamines,
  e.g., ethylenediamine, 1,2-propanediamine, 1,3-propanediamine, 2-methyl-1,2-propanediamine, 2,2-dimethyl-1,3-propanediamine, 1,3-butanediamine, 1,4-butanediamine, 1,3-pentanediamine (DAMP), 1,5-pentanediamine, 1,5-diamino-2-methylpentane (MPMD), 2-butyl-2-ethyl-1,5-pentanediamine (C11-neodiamine), 1,6-hexanediamine, 2,5-dimethyl-1,6-hexanediamine, 2,2,4- and 2,4,4-trimethylhexamethylenediamine (TMD), 1,7-heptanediamine, 1,8-octanediamine, 1,9-nonanediamine, 1,10-decanediamine, 1,11-ecanediamine, 1,12-dodecanediamine, 1,2-, 1,3- and 1,4-diaminocyclohexane, bis-(4-aminocyclohexyl)methane ($H_{12}$-MDA), bis-(4-amino-3-methylcyclohexyl)methane, bis-(4-amino-3-ethylcyclohexyl)methane, bis-(4-amino-3,5-dimethylcyclohexyl)methane, bis-(4-amino-3-ethyl-5-methylcyclohexyl)methane (M-MECA), 1-amino-3-aminomethyl-3,5,5-trimethylcyclohexane (=isophoronediamine or IPDA), 2- and 4-methyl-1, 3-diaminocyclohexane and mixtures thereof, 1,3- and 1,4-bis-(aminomethyl)cyclohexane, 2,5(2,6)-bis-(aminomethyl)-bicyclo[2.2.1]heptane (NBDA), 3(4),8(9)-bis-(aminomethyl)-tricyclo[5.2.1.0$^{2,6}$]decane, 1,4-diamino-2,2,6-trimethylcyclohexane (TMCDA), 1,8-menthanediamine, 3,9-bis-(3-aminopropyl)-2,4,8,10-tetraoxaspiro[5.5]ecane and 1,3- and 1,4-xylylenediamine;
- aliphatic primary diamines containing ether groups,
  e.g., bis(2-aminoethyl)ether, 3,6-dioxaoctane-1,8-diamine, 4,7-dioxadecane-1,10-diamine, 4,7-dioxadecane-2,9-diamine, 4,9-dioxadodecane-1,12-diamine, 5,8-dioxadodecane-3,10-diamine, 4,7,10-tgrioxatridecane-1,13-diamine and higher oligomers of these diamines, bis-(3-aminopropyl)polytetrahydrofuranes and other polytetrahydrofuranediamines having molecular weights ranging, e.g., from 350 to 2000, as well as polyoxyalkylenediamines. Typically, the latter are products of the amination of polyoxyalkylene diols and can, for example, be obtained under the name Jeffamine® (from Huntsman), under the name Polyetheramin (from BASF) or under the name PC Amine® (from Nitroil). Particularly suitable polyoxyalkylenediamines are Jeffamine® D-230, Jeffamine®

D-400, Jeffamine® D-2000, Jeffamine® XTJ-511, Jeffamine® ED-600, Jeffamine® ED-900, Jeffamine® ED-2003, Jeffamine® XTJ-568, Jeffamine® XTJ-569, Jeffamine® XTJ-523, Jeffamine® XTJ-536, Jeffamine® XTJ-542, Jeffamine® XTJ-559, Jeffamine® EDR-104, Jeffamine® EDR-148, Jeffamine® EDR-176; Polyetheramin D 230, Polyetheramin D 400, and Polyetheramin D 2000, PC Amine® DA 250, PC Amine® DA 400, PC Amine® DA 650, and PC Amine® DA 2000;

Polyamines having secondary amino groups, e.g., diethylenetriamine (DETA), dipropylenetriamine (DPTA), bishexamethylenetriamine (BHMT), 3-(2-aminoethyl)aminopropylamine, N3-(3-aminopentyl)-1, 3-pentanediamine, N5-(3-aminopropyl)-2-methyl-1,5-pentanediamine, N5-(3-amino-1-ethylpropyl)-2-methyl-1,5-pentanediamine, N,N'-dibutylethylenediamine; N,N'-di-tert.butyl-ethylenediamine, N,N'-diethyl-1,6-hexanediamine, 1-(1-methylethylamino)-3-(1-methylethylaminomethyl)-3,5,5-trimethylcyclohexane (Jefflink® 754 from Huntsman), N4-cyclohexyl-2-methyl-N2-(2-methylpropyl)-2,4-pentanediamine, N,N'-dialkyl-1,3-xylylenediamine, bis-(4-(N-alkylamino)cyclohexyl)methane, 4,4'-trimethylenedipiperidine, N-alkylated polyetheramines, e.g., the Jeffamine® types SD-231, SD-401, SD-404, and SD-2001 (from Huntsman);

amine/polyepoxide addition products, in particular additions products of the mentioned polyamines with diepoxides with a molar ratio of at least 2/1, in particular with a molar ration from 2/1 to 6/1;

Polyamidoamines which are the reaction products of a mono- or polybasic carboxylic acid or the esters or anhydrides thereof, in particular the reaction products of a dimer fatty acid, and a aliphatic, cycloaliphatic or aromatic polyamine used in a stoichiometric excess, in particular a polyalkyleneamine such as, e.g., DETA or triethylenetetramine (TETA), in particular the commercially available polyamidoamines Versamid® 100, 125, 140, and 150 (from Cognis), Aradur® 223, 250, and 848 (from Huntsman), Euretek® 3607, Euretek® 530 (from Huntsman), Beckopox® EH 651, EH 654, EH 655, EH 661, and EH 663 (from Cytec);

Polyethyleneimines (PEI).

These are branched polymeric amines derived from the polymerization of ethyleneimine. A suitable polyethyleneimine typically has an average molecular weight in the range from 250 to 25,000 g/mol and contains tertiary, secondary, and primary amino groups. Polyethyleneimines can be obtained, for example, under the trade name Lupasol® (from BASF), for example, the types Lupasol® FG, Lupasol® G20, and Lupasol® PR 8515.

Cashew nutshell based amines

These are reaction products from cardanol, the main component of cashew nutshell liquid (CNSL) and amines, leading to phenalkamine structures. These are reweable raw materials with very good properties for use as hardener B.

Suitable polyamines are in particular polyoxyalkylenediamines having molecular weights of less than 500 g/mol (Jeffamine® D-230, Jeffamine D400, Jeffamine® EDR-148), 4,7,10-trioxatridecane-1-13-diamine, 4,9-dioxadodecane-1,12-diamines, ethylendiamine, and/or 3(4),8(9)-bis (aminomethyl)tricyclo[5.2.1.0$^{2,6}$]decane (TCD-Diamin®, manufactured by Celanese Chemicals). It has been shown that in particular polyethyleneimines having a molecular weight Mw of less than 100,000 g/mol, in particular of less than 50,000 g/mol are particularly suitable.

In particular, polyamines that preferably are diamines or triamines, are selected from the group consisting of aliphatic diamines or triamines containing ether groups, in particular polyoxyalkylenediamines and -triamines; in particular polyoxyethylenediamines and -triamines, polyoxypropylenediamines and -triamines; polyoxybutylenediamines and -triamines, amino group terminated polybutadienes and butadiene/acrylonitrile copolymers or a mixture thereof.

In particular, these are polyoxyalkylene polyamines having two or three amino groups such as are commercially available, for example, under the name Jeffamine® (from Huntsman Chemicals), under the name Polyetheramin (from BASF) or under the name PC Amine® (from Nitroil) and mixtures of the above-mentioned polyamines.

In preferred embodiments of the two-component composition according to the present invention, said hardener B comprises di- and/or tri-functional polyamines, in particular polyetheramines.

Furthermore, the hardener component K2 may comprise an accelerator. Suitable accelerators are substances which accelerate the reaction between amino groups and epoxide groups, in particular acids or compounds hydrolyzable to acids, in particular organic carboxylic acids such as acetic acid, benzoic acid, salicylic acid, 2-nitrobenzoic acid, lactic acid, organic sulfonic acids such as methanesulfonic acid, p-toluenesulfonic acid or 4-dodecylbenzenesulfonic acid, sulfonic acid esters, other organic or inorganic acids such as in particular phosphoric acid, or mixtures of the abovementioned acids and acid esters; Tertiary amines such as in particular the already mentioned accelerator B, or 1,4-diazabicyclo [2.2.2] octane, triethanolamine, imidazoles such as in particular N-methylimidazole, N-vinylimidazole or 1,2-dimethylimidazole, salts of such tertiary amines, quaternary ammonium salts, in particular benzyltrimethylammonium chloride, amidines, in particular 1,8-diazabicyclo[5.4.0]undec-7-enes, guanidines, in particular 1,1,3,3-tetramethylguanidine, phenols, in particular bisphenols, phenol-resins or Mannich bases such as in particular 2,4,6-tris(dimethylaminomethyl) phenol or 2,4,6-tris (N, N-dimethyl-4-amino-2-azabutyl)phenol, phosphites such as in particular di- or triphenyl phosphites, or mercapto-containing compounds. Preferred as accelerators are acids, tertiary amines or Mannich bases.

Most preferred among those is salicylic acid or 2,4,6-tris (dimethylaminomethyl)phenol or 2,4,6-tris(N,N-dimethyl-4-amino-2-azabutyl) phenol or a combination thereof.

Furthermore preferred as accelerators are in particular compounds comprising at least one dimethylamino group. in particular benzyldimethylamine, α-methylbenzyldimethylamine, N,N-diethyl-N',N'-dimethyl-1,3-propanediamine, N, N-dimethylethanolamine, 3-(N,N-dimethylamino)propane-1-ol, 2- or 4-(dimethylaminomethyl)phenol, 2,4- or 2,6-bis (N,N-dimethylaminomethyl)phenol, 2,4,6-tris(N,N-dimethylaminomethyl)phenol, 2,4,6-tris(N,N-dimethyl-4-amino-2-azabutyl)phenol or in particular N,N,N',N'-tetra-methyl-1,2-ethanediamine, N,N,N',N'-tetramethyl-1,3-propanediamine, N,N,N',N'-tetramethyl-1,4-butanediamine, N,N,N',N'-tetramethyl-1,6-hexanediamine, N, N, N',N', N''-pentamethyldiethylenetriamine, N, N, N',N', N''-Pentamethyldipropylentriamine, N,N,N',N',N''-pentamethyl-N-(2-aminoethyl)-1,3-propanediamine, N,N-dimethyl-1,2-ethanediamine, N,N-dimethyl-1,3-propanediamine, N,N-dimethyl-1,4-butanediamine, N,N-dimethyl-1,6-hexanediamine, 2-(2-(dimethylamino)ethylamino)ethylamine, 2-(3-(dimethylamino)propylaminoethylamine, 3-(2-(dimethylamino)ethylamino) propylamine, 3-(3-(dimethylaminopropylamino)propylamine (DMAPAPA), Bis (2-(N,N-dimethylamino)ethyl) amine or bis(3-(N,N-dimethylamino)propyl) amine.

Particularly preferred is N,N,N',N',N''-pentamethyldiethylenetriamine, 3-(3-(dimethylamino)propylamino)propylamine (DMAPAPA) or bis(3-(N,N-dimethylamino)propyl)amine. These accelerators are easily available, have low odor and enable high compressive strengths, high adhesive forces and hardly any curing problems in the cold. Most preferred as accelerator is 3-(3-(dimethylamino)propylamino)propylamine (DMAPAPA). DMAPAPA has a low odor, is toxicologically safe and commercially available.

Furthermore, the two-component composition comprises between 2 and 35 wt.-%, preferably between 3 and 25 wt.-%, in particular between 5 and 15 wt.-%, based on the total weight of the two-component composition, of at least one impact modifier I in either one or both of components K1 and K2. This amount refers to the pure active impact modifier without solvents or other solid or liquid additives commonly used for better storage, handling, dispersion, dilution, or other purposes.

Preferably, impact modifier I is contained in component K1, in particular exclusively in component K1. Within this embodiment, the amount of impact modifier I is preferably between 3 and 45 wt.-%, preferably between 5 and 30 wt.-%, in particular between 10 and 20 wt.-%, based on the total weight of component K1.

Impact modifier I is a reaction product of at least one polymeric diol, at least one polyisocyanate, and cardanol.

In this reaction, the polymeric diol is preferably reacted in a first step with the polyisocyanate in order to yield an isocyanate-functional polyurethane prepolymer. The isocyanate groups of said polyurethane prepolymer are then preferably endcapped with cardanol in order to yield the final impact modifier I. Said impact modifier I preferably contains no more isocyanate groups in measurable amounts. In particular, it is preferred that at least 75%, in particular at least 90%, preferably at least 99% of all remaining isocyanate groups of said prepolymer are endcapped with cardanol after reaction.

It is possible to produce a prepolymer with significant amounts of chain extension when the polymeric diol and the polyisocyanate are reacted. It is also possible to produce a prepolymer with essentially no chain extension when the polymeric diol and the polyisocyanate are reacted. The skilled person in the field of polyurethane chemistry is able to control the amount of chain extension, e.g. by adjusting the relative molar ratio of polymeric diol to polyisocyanate. With a significant molar excess of polyisocyanate, the chain extension reactions will be suppressed, yielding isocyanate-functional prepolymers with mainly no chain-extended polymer chains. When the molar ratio of polymeric diol and polyisocyanate, in particular diisocyanate, approaches 1:1, significant chain extension is to be expected. In general, a molar excess of polyisocyanate is preferred. However, when a large excess of polyisocyanate is used, non-reacted polyisocyanate may have to be removed after reaction, e.g. by distillation or chemical derivatization.

The isocyanate group-containing prepolymer for impact modifier I is obtained, in particular, from the reaction of at least one monomeric polyisocyanate, in particular diisocyanate, and at least one suitable diol. The reaction is preferably carried out with exclusion of moisture at a temperature in the range from 20 to 160° C., in particular from 40 to 140° C., if appropriate in the presence of suitable catalysts.

The NCO/OH ratio is preferably in the range of 1.1/1 to 10/1, preferably 1.3/1 to 10/1. The monomeric polyisocyanate remaining in the reaction mixture after the reaction of the OH groups can be removed, in particular by means of distillation.

In the event that excess monomeric polyisocyanate is removed by distillation, the NCO/OH ratio in the reaction is preferably in the range from 3/1 to 10/1, in particular 4/1 to 7/1, and the resulting isocyanate group-containing prepolymer after the distillation preferably contains at most 0.5% by weight, particularly preferably at most 0.3% by weight, of monomeric polyisocyanate.

In the event that no excess monomeric polyisocyanate is removed from the prepolymer, the NCO/OH ratio in the reaction is preferably in the range from 1.3/1 to 2.5/1. Such a prepolymer contains in particular at most 3% by weight, preferably at most 2% by weight, of monomeric polyisocyanate.

Preferred impact modifiers I are a polymer of the formula (IV).

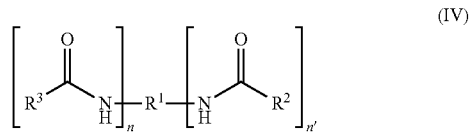

(IV)

In this formula, n and n' independently of one another are each values of 0 or 1, preferably 1, with the proviso that at least one, preferably both of n and n' are not 0;

$R^1$ is a linear polyurethane prepolymer containing at least n+n' terminal isocyanate groups, after removal of n+n' terminal isocyanate groups;

$R^2$ and $R^3$ are residues of cardanol after removal of the hydroxyl H atom and are bonded via the oxygen atom.

Cardanol (CAS registry number: 37330-39-5) is a phenolic lipid obtained from anacardic acid, the main component of cashew nutshell liquid (CNSL), a byproduct of cashew nut processing. The name of the substance is derived by contraction from the genus *Anacardium*, which includes the cashew tree, *Anacardium occidentale*. The structure is shown in formula (V).

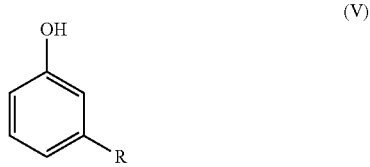

$R = C_{15}H_{31-n}$;
n = 0,2,4,6

(V)

The name cardanol is used for the decarboxylated derivatives obtained by thermal decomposition of any of the naturally occurring anacardic acids. This includes more than one compound because the composition of the side chain varies in its degree of unsaturation. Tri-unsaturated cardanol, the major component (41%) is shown below in formula (VI). The remaining cardanol is 34% mono-unsaturated, 22% bi-unsaturated, and 2% saturated.

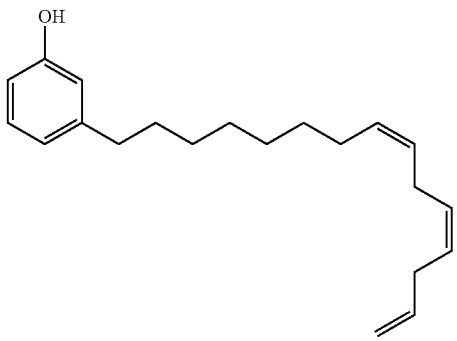

(VI)

The phenolic OH group of cardanol readily reacts with the isocyanate groups of the isocyanate-functional prepolymer to yield impact modifier I.

It is noteworthy and surprising that cardanol is the only phenolic reagent that can be used in production of the impact modifier I of the present invention. Other, similar phenolic reagents, in particular nonylphenol, do not lead to an impact modifier with the same beneficial properties as impact modifier I.

Furthermore, cardanol has the advantage of being based on natural, renewable resources and it is inexpensive.

Cardanol is commercially available, for example under the trade name Cardolite® NC-700 by Cardolite Corporation.

In the process for preparing prepolymer that is endcapped by cardanol to produce impact modifier I, at least one polymeric diol is used. Suitable polymeric diols are especially the following commercial diols or any desired mixtures thereof:

polyoxyalkylene diols, also called polyether diols or oligoetherols, which are polymerization products of ethylene oxide, 1,2-propylene oxide, 1,2- or 2,3-butylene oxide, oxetane, tetrahydrofuran or mixtures thereof, possibly polymerized with the aid of a starter molecule having two active hydrogen atoms, for example water or compounds having a plurality of OH or NH groups, for example ethane-1,2-diol, propane-1,2- and 1,3-diol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, cyclohexane-1,3- and -1,4-dimethanol, bisphenol A, hydrogenated bisphenol A, aniline, and mixtures of the aforementioned compounds. Preference is given to polyoxyalkylene diols having a low degree of unsaturation (measured to ASTM D-2849-69 and reported in milliequivalents of unsaturation per gram of polyol (meq/g)), prepared, for example, with the aid of double metal cyanide complex catalysts (DMC catalysts).

Particularly suitable are polyoxyalkylenediols, especially polyoxyethylene- and polyoxypropylenediols.

Additionally particularly suitable are what are called ethylene oxide-terminated (EO-endcapped) polyoxypropylenediols. The latter are polyoxyethylene-polyoxypropylene copolymers which are obtained, for example, by further alkoxylating polyoxypropylene diols with ethylene oxide on completion of the polypropoxylation reaction and thus have primary hydroxyl groups.

Styrene-acrylonitrile- or acrylonitrile-methyl methacrylate-grafted polyether diols.

Polyester diols, also called oligoesterols, prepared by known processes, especially the polycondensation of hydroxycarboxylic acids or the polycondensation of aliphatic and/or aromatic polycarboxylic acids with dihydric alcohols.

Especially suitable polyester diols are those prepared from dihydric alcohols, for example ethylene glycol, diethylene glycol, propylene glycol, dipropylene glycol, neopentyl glycol, butane-1,4-diol, pentane-1,5-diol, 3-methylhexane-1,5-diol, hexane-1,6-diol, octane-1,8-diol, decane-1,10-diol, dodecane-1,12-diol, 1,12-hydroxystearyl alcohol, cyclohexane-1,4-dimethanol, dimer fatty acid diol (dimer diol), neopentyl glycol hydroxypivalate, or mixtures of the aforementioned alcohols, with organic dicarboxylic acids, or the anhydrides or esters thereof, for example succinic acid, glutaric acid, adipic acid, trimethyladipic acid, suberic acid, azelaic acid, sebacic acid, dodecanedicarboxylic acid, maleic acid, fumaric acid, dimer fatty acid, phthalic acid, phthalic anhydride, isophthalic acid, terephthalic acid, dimethyl terephthalate, hexahydrophthalic acid, or mixtures of the aforementioned acids, and also polyester diols formed from lactones, for example from γ-caprolactone, and starters such as the aforementioned dihydric alcohols.

Polycarbonate diols as obtainable by reaction, for example, of the abovementioned alcohols—used to form the polyester diols—with dialkyl carbonates, diaryl carbonates or phosgene.

Block copolymers bearing two hydroxyl groups and having at least two different blocks having polyether, polyester and/or polycarbonate structure of the type described above, especially polyether polyester diols.

Polyacrylate- and polymethacrylatediols.

Dihydroxy-functional fats and oils, for example natural fats and oils, especially castor oil; or what are called oleochemical diols, obtained by chemical modification of natural fats and oils, for example the epoxy polyesters or epoxy polyethers obtained by epoxidation of unsaturated oils and subsequent ring opening with carboxylic acids or alcohols, or diols obtained by hydroformylation and hydrogenation of unsaturated oils; or diols obtained from natural fats and oils by degradation processes such as alcoholysis or ozonolysis and subsequent chemical linkage, for example by transesterification or dimerization, of the degradation products or derivatives thereof thus obtained. Suitable degradation products of natural fats and oils are especially fatty acids and fatty alcohols, and also fatty acid esters, especially the methyl esters (FAME), which can be derivatized, for example, by hydroformylation and hydrogenation to give hydroxy fatty acid esters.

Polyhydrocarbondiols, also called oligohydrocarbonols, for example dihydroxy-functional polyolefins, polyisobutylenes, polyisoprenes; dihydroxy-functional ethylene-propylene, ethylene-butylene or ethylene-propylene-diene copolymers, as produced, for example, by Kraton Polymers; dihydroxy-functional polymers of dienes, especially of 1,3-butadiene, which may also be prepared from anionic polymerization in particular; dihydroxy-functional copolymers of dienes such as 1,3-butadiene or diene mixtures and vinyl monomers such as styrene, acrylonitrile, vinyl chloride, vinyl acetate, vinyl alcohol, isobutylene and isoprene, for example dihydroxy-functional acrylonitrile/butadiene copolymers, as producible, for example, from epoxides or amino alcohols and carboxyl-terminated acrylonitrile/butadiene copolymers (commercially available, for example, under the Hypro® (formerly Hycar®) CTBN and CTBNX and ETBN name from Nanoresins AG, Germany, or Emerald Performance Materials LLC); and hydrogenated dihydroxy-functional polymers or copolymers of dienes.

Particular preference is given to such diols with an average OH functionality in the range of 1.5 to 2.5, preferably 1.8 to 2.3.

Preferred diols are polyoxyalkylene diols, polyester diols, polycarbonate diols, polybutadiene diols, and poly(meth)acrylate diols. Among those, particularly preferred are polyether diols, in particular polypropylene glycol diols and polytetrahydrofuran diols.

Particular preference is given firstly to, in particular room temperature liquid, polyoxypropylenediols and polyoxyethylene-polyoxypropylene codiols, especially polyoxypropylenediols having a mean molecular weight in the range from 300 to 15'000 g/mol, in particular 1'000 to 10'000 g/mol, preferably from 2'000 to 5'500 g/mol. Particular preference is given to such diols with an average OH functionality in the range of 1.5 to 2.5, preferably 1.8 to 2.3.

Particular preference is further given to room temperature liquid or solid, amorphous or semicrystalline or crystalline diols, especially polyesterpolyols and polycarbonate diols, especially polyesterdiols having a mean molecular weight in the range from 300 to 15'000 g/mol, in particular 1'000 to 10'000 g/mol, preferably 1'500 to 8000 g/mol, especially 2'000 to 5'500 g/mol. Particularly suitable are crystalline or semicrystalline adipic acid/hexanediol polyesters and dodecanedicarboxylic acid/hexanediol polyesters.

Particular preference is further given to polybutadiene diols with an average OH functionality in the range of 1.5 to 2.5, preferably 1.8 to 2.3, and an average molar mass in the range of 300 to 15'000 g/mol, in particular 1'000 to 10'000 g/mol, preferably 1'500 to 8000 g/mol, more preferably 2000 to 4000 g/mol, especially 2500 to 3000 g/mol.

Such polybutadiene polyols are especially obtainable by the polymerization of 1,3-butadiene and allyl alcohol in a suitable proportion or by the oxidation of suitable polybutadienes.

Suitable polybutadiene polyols are especially polybutadiene diols containing structural elements of formula (VII) and optionally structural elements of formulas (VIII) and (IX).

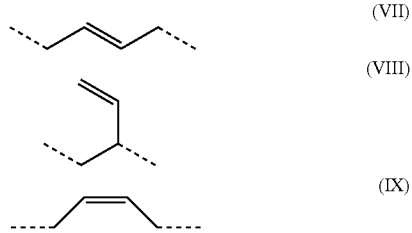

Preferred polybutadiene diols contain
40 to 80%, especially 55 to 65% of the structural element of formula (VII),
0 to 30%, especially 15 to 25%, of the structural element of formula (VIII),
0 to 30%, especially 15 to 25%, of the structural element of formula (IX).

Particularly suitable polybutadiene polyols are, for example, available form Cray Valley under the trade name range Poly Bd®.

Most preferred of all diols for the synthesis of impact modifier I are, in particular liquid at room temperature, polyoxypropylenediols and polyoxyethylene-polyoxypropylene codiols, especially polyoxypropylenediols having a mean molecular weight in the range from 300 to 15'000 g/mol, in particular 1'000 to 10'000 g/mol, preferably from 2,000 to 5'500 g/mol. With these diols, especially high impact peel strengths can be obtained.

Thus, in the most preferred embodiments, said diol is a polyoxypropylenediol r ao polyoxyethylene-polyoxypropylene copolymer diol, especially a polyoxypropylenediol having a mean molecular weight in the range from 300 to 15'000 g/mol, in particular 1'000 to 10'000 g/mol, preferably from 2,000 to 5'500 g/mol. Particular preference is given to such diols with an average OH functionality in the range of 1.5 to 2.5, preferably 1.8 to 2.3.

In the process for preparing prepolymer that is endcapped by cardanol to produce impact modifier I, at least one polyisocyanate, preferably diisocyanate is used.

Suitable polyisocyanates are especially monomeric di- or triisocyanates, as well as oligomers, polymers and derivatives of the monomeric di- or triisocyanates, as well as arbitrary mixtures thereof.

Suitable aromatic monomeric di- or triisocyanates are especially 2,4- and 2,6-toluene diisocyanate and arbitrary mixtures of these isomers (TDI), 4,4'-, 2,4'- and 2,2'-diphenylmethane diisocyanate and arbitrary mixtures of these isomers (MDI), mixtures of MDI and MDI homologs (polymeric MDI or PMDI), 1,3- and 1,4-phenylene diisocyanate, 2,3,5,6-tetramethyl-1,4-diisocyanatobenzene, naphthalene-1,5-diisocyanate (NDI), 3,3'-dimethyl-4,4'-diisocyanatodiphenyl (TODD, dianisidine diisocyanate (DADI), 1,3,5-tris-(iso-cyanatomethyl)benzene, tris-(4-isocyanatophenyl)methane and tris-(4-isocyanatophenyl)thiophosphate.

Suitable aliphatic monomeric di- or triisocyanates are especially 1,4-tetramethylene diisocyanate, 2-methylpentamethylene-1,5-diisocyanate, 1,6-hexamethylene diisocyanate (HDI), 2,2,4- and 2,4,4-trimethyl-1,6-hexamethylene diisocyanate (TMDI), 1,10-decamethylene diisocyanate, 1,12-dodecamethylene diisocyanate, lysine and lysine ester diisocyanate, cyclohexane-1,3- and -1,4-diisocyanate, 1-methyl-2,4- and -2,6-diisocyanato-cyclohexane and arbitrary mixtures of these isomers (HTDI or $H_6$TDI), isocyanato-3,3,5-trimethyl-5-isocyanatomethyl cyclohexane (=isophorone diisocyanate or IPDI), perhydro-2,4'- and -4,4'-diphenylmethane diisocyanate (HMDI or $H_{12}$MDI), 1,4-diisocyanato-2,2,6-trimethylcyclohexane (TMCDI), 1,3- and 1,4-bis-(isocyanatomethyl) cyclohexane, m- and p-xylylene diisocyanate (m- and p-XDI), m- and p-tetramethyl-1,3- and -1,4-xylylene diisocyanate (m- and p-TMXDI), bis-(1-isocyanato-1-methylethyl)naphthalene, dimer and trimer fatty acid isocyanates such as 3,6-bis-(9-isocyanatononyl)-4,5-di-(1-heptenyl)-cyclohexene (dimeryl diisocyanate) and α,α,α',α',α'',α''-hexamethyl-1,3,5-mesitylene triisocyanate.

Preferred among these are MDI, TDI, HDI and IPDI.

Suitable oligomers, polymers and derivatives of the monomeric di- and triisocyanates are especially derived from MDI, TDI, HDI and IPDI. Especially suitable among these are commercially available types, especially HDI-biurets such as Desmodur® N 100 and N 3200 (from Bayer), Tolonate® HDB and HDB-LV (from Rhodia) and Duranate® 24A-100 (from Asahi Kasei); HDI isocyanurates, such as Desmodur® N 3300, N 3600 and N 3790 BA (all from Bayer), Tolonate® HDT, HDT-LV and HDT-LV2 (from Rhodia), Duranate® TPA-100 and THA-100 (from Asahi Kasei) and Coronate® HX (from Nippon Polyurethane); HDI-uretdiones such as Desmodur® N 3400 (from Bayer); HDI-iminooxadiazine diones such as Desmodur® XP 2410 (from Bayer); HDI-allophanates such as Desmodur® VP LS 2102 (from Bayer); IPDI-isocyanurates, for example in solution as Desmodur® Z 4470 (from Bayer) or in solid form as Vestanat® T1890/100 (from Degussa); TDI oligomers such as Desmodur® IL (from Bayer); as well as mixed isocyanurates based on TDI/HDI, for example as Desmodur® HL (from Bayer). Also especially suitable are forms of MDI that are liquid at room temperature (so-called "modified MDI"), which represent mixtures of MDI with MDI derivatives, especially MDI carbodiimides or MDI uretoneimines or MDI urethanes, known under trade names such as Desmodur® CD, Desmodur® PF, Desmodur® PC (all from Bayer) or Isonate® M 143 (from Dow), as well as mixtures of MDI and MDI homologs (polymeric MDI or PMDI), available under trade names such as Desmodur® VL, Desmodur® VL50, Desmodur® VL R10, Desmodur® VL R20, Desmodur® VH 20 N and Desmodur® VKS 20F (all from Bayer), Isonate® M 309, Voranate® M 229 and Voranate® M 580 (all from Dow) or Lupranat® M 10 R (from BASF). The above-named oligomeric polyisocyanates in practice are usually mixtures of substances with different degrees of oligomerization and/or chemical structures. Preferably they have a mean NCO functionality of 2.1 to 4.0.

Preferably the polyisocyanate is selected from the group consisting of MDI, TDI, HDI and IPDI and oligomers, polymers and derivatives of the isocyanates mentioned, as well as mixtures thereof.

In some preferred embodiments, the polyisocyanate contains isocyanurate, iminooxadiazine dione, uretdione, biuret, allophanate, carbodiimide, uretoneimine or oxadiazinetrione groups.

The polyisocyanate is preferably a diisocyanate, meaning it contains on average or exactly two NCO groups. By using a diisocyanate, strictly linear polymers are obtained, which is advantageous for the impact modifier I since it imparts a higher toughness in the composition.

Suitable diisocyanates are especially commercially available aliphatic, cycloaliphatic, arylaliphatic and aromatic, preferably cycloaliphatic and aromatic, diisocyanates.

Preferred diisocyanates are hexamethylene 1,6-diisocyanate (HDI), 2,2,4- and 2,4,4-trimethylhexamethylene 1,6-diisocyanate (TMDI), cyclohexane 1,3- and 1,4-diisocyanate and any desired mixtures of these isomers, 1-isocyanato-3,3,5-trimethyl-5-isocyanatomethylcyclohexane (=isophorone diisocyanate or IPDI), perhydrodiphenylmethane 2,4'- and 4,4'-diisocyanate (HMDI), m- and p-xylylene diisocyanate (m- and p-XDI), m- and p-tetramethylxylylene 1,3- and 1,4-diisocyanate (m- and p-TMXDI), tolylene 2,4- and 2,6-diisocyanate (TDI) and any desired mixtures of these isomers, diphenylmethane 4,4'-, 2,4'- and 2,2'-diisocyanate and any desired mixtures of these isomers (MDI).

More preferably, the diisocyanate is selected from the group consisting of HDI, IPDI, MDI and TDI. These diisocyanates are particularly readily obtainable.

Particularly preferred as the polyisocyanate, in particular diisocyanate, are forms of MDI that are liquid at room temperature. These are especially so-called polymeric MDI as well as MDI with fractions of oligomers or derivatives thereof. The MDI (=4,4'-, 2,4'- or 2,2'-diphenylmethane diisocyanate and arbitrary mixtures of these isomers) contents of such liquid forms of MDI amounts, in particular, to 50 to 95 wt.-%, especially 60 to 90 wt.-%.

Particularly preferred as the polyisocyanate are polymeric MDI and MDI types that are preferably liquid at room temperature, which contain fractions of MDI-carbodiimides or adducts thereof.

Most preferred polyisocyanate for the synthesis of impact modifier I is 4,4'-, 2,4'- and 2,2'-diphenylmethane diisocyanate and arbitrary mixtures of these isomers (MDI), mixtures of MDI and MDI homologs (polymeric MDI or PMDI), in particular forms that are liquid at room temperatures, as well as MDI with fractions of oligomers or derivatives thereof. The MDI (=4,4'-, 2,4'- or 2,2'-diphenylmethane diisocyanate and arbitrary mixtures of these isomers) contents of such liquid forms of MDI amounts, in particular, to 50 to 95 wt.-%, especially 60 to 90 wt.-%.

Thus, in most preferred embodiments, said polyisocyanate is 4,4'-, 2,4'- or 2,2'-diphenylmethane diisocyanate and arbitrary mixtures of these isomers (MDI). Impact modifiers I based on MDI allow for especially high impact peel strengths.

Preferably, impact modifier I is a linear polymer obtained by the reaction of a diol, a diisocyanate, and cardanol. By using diisocyanates, strictly linear polymers are obtained, which leads to especially high impact peel strength in the two-component composition. By using a diol (and not a triol or other higher functional polyols), impact modifier I is in any case a predominantly linear polymer. However, when very high functional polyisocyanates are used, e.g. with functionalities of 3 or higher, some degree of branching may occur, depending on the reaction conditions during synthesis of the isocyanate-functional prepolymer, which is not beneficial for the effect of impact modifier I.

To avoid this, it is thus preferred to use diisocyanates or polyisocyanates with average nominal NCO functionalities of <3, in particular <2.5.

Impact modifier I preferably has an apparent epoxy equivalent weight of >500 g/eq, in particular >1000 g/eq, preferably >1500 g/eq, in particular >2000 g/eq.

The two-component epoxy resin composition preferably contains said impact strength modifier I with an amount of between 5 and 15 wt.-%, based on the total weight of the two-component composition.

Furthermore, the two-component composition preferably comprises between 0 and 80 wt.-%, in particular between 5 and 55 wt.-%, preferably between 15 and 35 wt.-%, based on the total weight of the two-component composition, of at least one filler in either one or both of components K1 and K2.

The use of fillers is advantageous in that they improve the aging resistance of the adhesive and advantageously influence the mechanical properties and/or application properties.

Suitable as filler are inorganic and organic fillers, for example, ground or precipitated calcium carbonates, optionally coated with fatty acids, in particular stearates, barium sulfate (heavy spar), talcs, quartz flours, quartz sands, dolomites, wollastonites, kaolins, mica (potassium aluminum silicate), molecular sieves, aluminas, aluminum hydroxides, silicas (pyrogenic or precipitated), cristobalite, cements, gypsums, flue ashes, carbon blacks, graphite, metal powders such as aluminum, copper, iron, silver, or steel, PVC powders or hollow spheres, such as solid or hollow glass spheres and organic hollow spheres.

Furthermore suitable as filler are layer minerals, in particular layered minerals exchanged with organic ions. The ion-exchanged layered mineral may be either a cation-exchanged or an anion-exchanged layered mineral. It is also possible that the adhesive simultaneously contains a cation-exchanged layered mineral and an anion-exchanged layered mineral. Such layered minerals may have the additional advantage of acting as corrosion inhibitors. Preferred as a layer mineral is a layered silicate.

Moreover, the two-component epoxy resin composition may comprise further additives. These are, for example:

solvents, film forming auxiliaries or extenders such as toluene, xylene, methylethyl ketone, 2-ethoxyethanol, 2-ethoxyethyl acetate, benzyl alcohol, ethylene glycol, diethylene glycol butyl ether, dipropylene glycol butyl ether, ethylene glycol butyl ether, ethylene glycol phenyl ether, N-methylpyrrolidone, propylene glycol butyl ether, propylene glycol phenyl ether, diphenylmethane, diisopropylnaphthalene, mineral oil fractions such as, for example, Solvesso types (from Exxon), aromatic hydrocarbon resins, in particular phenol group containing types, sebacates, phthalates, organic phosphoric and sulfonic esters and sulfonamides;

reactive diluents, e.g., epoxy reactive diluents which have been mentioned above, epoxidized soy oil or flax oil, compounds having acetoacetate groups, in particular acetoacetylated polyols, butyrolactone as well as, moreover, isocyanates and silicones having reactive groups;

polymers such as, e.g., polyamides, polysulfides, polyvinylformal (PVF), polyvinylbutyral (PVB), polyurethanes (PUR), polymers containing carboxylic groups, polyamides, butadiene-acrylonitrile copolymers, styrene-acrylonitrile copolymers, butadiene-styrene-copolymers, homo- or copolymers of unsaturated monomers, in particular of the group comprising ethylene, propylene, butylene, isobutylene, isoprene, vinyl acetate, and alkyl(meth)acrylates, in particular chlorosulfonated polyethylenes and polymers containing fluorine, sulfonamide-modified melamines, and cleaned montan waxes;

fibers, for example, of plastics, carbon, or glass;

pigments, for example, titanium dioxide or iron oxides or organic pigments;

rheology modifiers such as, in particular, thickeners, for example, sheet silicates such as bentonites, derivatives of castor oil, hydrogenated castor oil, polyamides, polyurethanes, urea compos, pyrogenic silicic acids, cellulose ethers, and hydrophobically modified polyoxyethylenes;

adhesion promoters, for example, organoalkoxysilanes such as 3-glycidoxypropyltrimethoxysilane, 3-aminopropyltrimethoxysilane, N-(2-aminoethyl)-3-aminopropyltrimethoxysilane, N-(2-aminoethyl)-N'[3-(trimethoxysilyl)propyl]ethylenediamine, 3-ureidopropyltrimethoxysilane, 3-chloropropyltrimethoxysilane, vinyltrimethoxysilane, or the corresponding organosilanes with ethoxy groups or (poly)etheroxy groups instead of methoxy groups;

oxidation, corrosion, heat, light, and UV radiation stabilizers;

flame retardants, in particular compounds such as alumina ($Al(OH)_3$; also called ATH for "aluminum trihydrate"), magnesium hydroxide ($Mg(OH)_2$; also called MDH for "magnesium dihydrate"), ammonium sulfate (($NH_4)_2SO_4$), boric acid ($B(OH)_3$), zinc borate, melamine borate, and melamine cyanurate; compounds containing phosphorus such as ammonium phosphate (($NH_4)_3PO_4$), ammonium polyphosphate, melamine phosphate, melamine pyrophosphate, triphenyl phosphate, diphenyl cresyl phosphate, tricresyl phosphate, triethyl phosphate, tris-(2-ethylhexyl) phosphate, trioctyl phosphate, mono-, bis-, and tris(isopropylphenyl) phosphate, resorcinolbis(diphenyl phosphate), resorcinol diphosphate oligomer, tetraphenylresorcinol diphosphite, ethylenediamine diphosphate, and bisphenol A bis(diphenyl phosphate); halogen-containing compounds such as chloroalkylphosphates, in particular tris(chloroethyl) phosphate, tris(chloropropyl) phosphate, and tris(dichloroisopropyl) phosphate, polybrominated diphenyl ethers, in particular decabromodiphenyl ether, polybrominated diphenyl oxide, tris[3-bromo-2,2-bis(bromomethyl)propyl] phosphate, tetrabromo bisphenol A, bis(2,3-dibromopropyl ether) of bisphenol A, brominated epoxy resins, ethylene-bis(tetrabromophtalimide), ethylenebis(dibromonorbornanedicarboximide), 1,2-bis-(tribromophenoxy)ethane, tris(2,3-dibromopropyl) isocyanurate, tribromophenol, hexabromocyclododecane, bis(hexachlorocyclopentadieno)cyclooctane, and chloroparaffins; as well as combinations of a halogen-containing compo and antimony trioxide ($Sb_2O_3$), or antimony pentoxide ($Sb_2O_5$);

surfactants such as, for example, wetting agents, flow control agents, deaerating agents or defoaming agents;

biocides, such as, for example, algicides, fungicides or substances that inhibit fungal growth.

It is clear and known to a person skilled in the art which additives may be added to the resin component K1 and which may be added to the hardener component K2. Here, in particular, it has to be ensured that the storage stability is not or only slightly impaired by such additives. Thus, it is clear to a person skilled in the art that a polyamine will react with epoxides in the resin component K1 and can consequently only be comprised in the hardener component K2.

In preferred embodiments, the two-component epoxy resin composition contains in either one or both of components K1 and K2 additives, preferably selected from the list consisting of adhesion promoters, wetting agents, and degassing agents, with an amount of between 0.1 and 5 wt.-%, preferably between 0.25 and 4 wt.-%, in particular between 0.5 and 3 wt.-%, based on total two-component composition.

A preferred embodiment of the two-component epoxy resin composition according to the present invention consists of:

said first component K1, comprising between 25 and 85 wt.-%, based on component K1, of said least one epoxy resin A, and between 0 and 15 wt.-%, based on component K1, of at least one epoxy-functional reactive diluent, and between 0 and 25 wt.-%, based on component K1, of at least one filler, and between 5 and 25 wt.-%, based on component K1, of said impact modifier I;

said second component K2, comprising between 30 and 70 wt.-%, based on component K2, of said hardener B for epoxy resins, and between 25 and 65 wt.-%, based on component K2, of at least one filler, and between 0.5 and 7 wt.-%, based on component K2, of at least one accelerator for the curing of epoxy resins.

In the two-component epoxy resin composition according to the present invention, the ratio of the number of amine groups which are reactive toward epoxide groups relative to the number of epoxide groups is preferably in the range of 0.7 to 1.5, in particular 0.8 to 1.2.

Preferably, the mixing ratio by volume or weight of the two components K1 and K2 is adjusted such that the mentioned ratio of the number of amine groups which are reactive toward epoxide groups relative to the number of epoxide groups is established.

Alternatively, the respective amounts of epoxy resin A and hardener B within component K1 and K2, respectively, is adjusted such that the above mentioned ratio of the number of amine groups which are reactive toward epoxide groups relative to the number of epoxide groups is established in a given mixing ratio, for example as defined by the application apparatus. A preferred mixing ratio is for example 100:100 to 100:10 by volume and/or approximately 100:120 to 100:10 by weight. Another preferred mixing ratio is approximately 1:1 by volume. This mixing ratio has the advantage that a more precise, more homogeneous mixing can be achieved and furthermore, the mixing and measuring process is simplified, for example by employing a double cartridge gun with attached static mixer and two pistons moving simultaneously.

The components K1 and K2 of the two-component epoxy resin composition are stored before mixing and application in separate containers. A suitable container for storing the resin K1 or hardener K2 component is in particular a barrel, a bag, a bucket, a can, a cartridge or a tube. The components are storage-stable, which means that they can be stored for several months to a year or longer before use, without changing in their respective properties to a degree relevant to their use. For the application of the epoxy resin composition, the resin and the hardener component K1 and K2 and an optionally present further component are mixed together shortly before or during the application.

The mixing of the components takes place by means of a suitable method. The mixing can be continuous or batch wise. If the mixing takes place before the application, care must be taken that the mixing of the components and the application does not take too much time, since this can lead to disturbances, for example to a slowed or incomplete buildup of the adhesion. The mixing takes place in particular at ambient temperature, which is typically in the range of about 0 to 40° C., preferably at about 5 to 30° C.

When mixing the components, the curing begins by chemical reaction. In this case, the epoxide groups react with the amino hydrogen-carrying amino groups and any other groups which are reactive toward epoxide groups and ring-open to give amino alcohol units. Further epoxide groups react with one another under anionic polymerization, in particular catalyzed by dimethylamino groups. As a result of these reactions, the adhesive cures to a crosslinked material. It is known to the person skilled in the art that primary amino groups are "difunctional" towards epoxide groups, meaning they can react with two separate epoxy groups.

Curing takes place at elevated temperature, for example between 20 and 180° C., in particular between 30 and 100° C., preferably between 50 and 80° C., or in other embodiments at ambient temperature, especially room temperature. Other embodiments cure also at lower temperatures, for example between 0 and 20° C., preferably between 5 and 15° C. Curing typically extends over a few hours to days until it is largely completed under the conditions given. Curing at higher temperatures generally takes place faster. Important influencing factors for the curing rate are the temperature, the stoichiometry and the presence of accelerators.

As a result of the curing reaction, a cured adhesive is obtained.

Preferably, the application and curing of the adhesive takes place at ambient temperature, in particular at a temperature in the range of 0 to 40° C., in particular 5 to 30° C. This allows a particularly simple handling of the adhesive and is particularly advantageous, e.g., outdoors, on construction sites and in unheated industrial buildings.

The two-component epoxy resin composition preferably exhibits after curing an Elastic Modulus of at least 2000 MPa, measured according to DIN EN ISO 527, and an and Impact Peel Strength of at least 10 N/mm, in preferred embodiments at least 15 N/mm, especially at least 20 N/mm, measured according to ISO 11343.

The two-component epoxy resin composition is suitable as adhesive on many substrate materials.

For example, suitable materials include:
metals or alloys such as aluminum, iron, steel or non-ferrous metals, or surface-refined metals or alloys such as galvanized or chromium-plated metals;
Wood, wood-resin composites, such as phenolic, melamine or epoxy resins, bonded wood materials or other so-called polymer composites;
Stone, ceramics, glass, tiles;
Plastics, in particular hard or soft polyvinyl chloride (PVC), flexibilized poly-olefin (Combiflex®), adhesion-modified chlorosulfonated polyethylene (Hypalon®), ABS, polycarbonate (PC), polyamide (PA), polyester, PMMA, epoxy resins, PUR, POM, PO, PE, PP, EPM or EPDM, the plastics optionally being replaced by plasma, Corona or flames are surface treated; and
Fiber reinforced plastics such as Carbon Fiber Reinforced Composite Plastics (CFRP), Glass Fiber Reinforced Plastics (GRP) or Sheet Molding Compounds (SMC).

A further aspect of the present invention is the use of a reaction product of at least one polymeric diol, at least one polyisocyanate, and cardanol as impact modifier or toughener in a two-component epoxy resin composition.

The impact modifier corresponds to the impact modifier I as described above, and its preferred embodiments are in this aspect the same as for the impact modifier I in general, as described further above. Preferred embodiments of that two-component epoxy resin composition are the same as those defined throughout this document.

In preferred embodiments of that use, said polymeric diol is selected from the group consisting of polyether diols, polyester diols, polycarbonate diols, poly(meth)acrylate diols, and polybutadiene diols.

In the same or other preferred embodiments of that use, said polymeric diol has an average molecular weight $M_n$, measured by GPC against polystyrene standard, of between 300 and 15'000 g/mol, in particular between 1000 and 10'000 g/mol, preferably between 2000 and 5500 g/mol.

Yet another aspect of the present invention is an adhesively bonded article, wherein the adhesive for the adhesive bond is a two-component epoxy resin composition as described further above.

EXAMPLES

Examples are given below which illustrate the invention further but do not limit the scope of the invention in any way and merely illustrate some of the possible embodiments. "Standard conditions" or "norm climate" ("NK") refers to a temperature of 23° C. and 50% relative humidity (r.h.).

Test Methods

The following test methods were employed:
Tensile Strength (TS), Elongation at Break (EOB) and Elastic Modulus (E-Mod) (DIN EN ISO 527)

These mechanical properties were determined by applying and curing the mixed adhesive in the standard climate into a silicone mold to form dumbbell-shaped bars (specimen type 1A of DIN EN ISO 527) having a thickness of 4 mm, a length of 150 mm, a land length of 80 mm and a land width of 10 mm. After 4 hours curing time at a temperature of 70° C., the test specimens were released from the mold. The specimens were measured under standard conditions at a pulling speed of 1 mm/min (E-Mod) or 10 mm/min (TS, EOB), respectively. The tensile strength, elongation at break and the modulus of elasticity 0.05-0.25% were determined according to DIN EN ISO 527.

Impact Peel Strength (IPS) (ISO 11343)

The test specimens were prepared from the example compositions described and with electrogalvanized DC04 steel (eloZn) having dimensions 90×20×0.8 mm, where the adhesion surface area was 30×20 mm with a layer thickness of 0.3 mm. They were cured for 4 h at 70° C. The impact peel strength was measured at 23° C. according to ISO 11343 with an impact velocity of 2 m/s. The failure mode was also determined. "AF" means adhesive failure, "CF" means cohesive failure.

Viscosity

The viscosity the respective freshly mixed two-component compositions was determined using a viscometer with a plate-plate set-up having a plate diameter of 25 mm. The samples were measured at 23° C., at a gap size of 1 mm and at a shear stress of 10 s$^{-1}$. The samples were pre-sheared for 40 seconds and measured for 80 seconds (8 measuring points).

Example Two-Component Epoxy Resin Compositions

A series of two-component example composition were prepared using the substances listed in Table 1. Tables 2 to 4 show example compositions consisting of components K1 and K2. All amounts are in wt.-% (percent by weight) based on the respective component K1. For components K2, commercially available hardener components of two-component epoxy adhesives were, available from Sika Schweiz AG.

The individual components K1 in each experiment were prepared by adding the ingredients in their respective amount to a centrifugal mixer and mixing them homogeneously.

TABLE 1

Employed chemicals and ingredients.

| Abbreviation | Description | Trade name (supplier) |
|---|---|---|
| BADGE | Bisphenol A diglycidyl ether (main epoxy resin) | D.E.R. ®331 (Olin) |
| Desmocap 11 | Branched polymer with ether and urethane groups; isocyanate groups blocked by nonylphenol (impact modifier) | Desmocap ® 11 (Covestro) |
| Desmocap 12 | Linear polymer with ether and urethane groups; isocyanate groups blocked by nonylphenol (impact modifier) | Desmocap ® 12 (Covestro) |
| Desmocap 14 | Branched polymer with ether and urethane groups; isocyanate groups blocked by cardanol (impact modifier) | Desmocap ® 14 CNB (Covestro) |
| Araldite DY-D | Diglycidylether of butanediol (epoxy-functional reactive diluent) | Araldite ® DY-D (Huntsman) |
| Silane A-187 | Gamma-Glycidoxypropyltrimethoxysilane (adhesion promoter) | Silquest* A-187 (Momentive) |
| Silica | Pyrogenic, hydrophobic silica (filler) | — |
| Chalk | Ground, natural chalk (filler) | — |
| WTG-1050 (B) | Commercial amine-based hardener component of Sikadur ® WTG-1280 LD, a toughened two-component epoxy adhesive for wind turbine blade bonding | Sikadur ® WTG-1050 (B) (Sika Schweiz AG) |
| WTG-1280 (B) | Commercial amine-based hardener component of Sikadur ® WTG-1280, a toughened two-component epoxy adhesive for wind turbine blade bonding | Sikadur ® WTG-1280 (B) (Sika Schweiz AG) |

For testing, a homogenous mixture of each respective component K1 and K2 in each example two-component composition was prepared using a stirrer and directly applied to the substrate surfaces used for preparing the test pieces. Immediately after mixing of the components K1 and K2, the testing protocol was employed.

Test data is shown for each composition in Tables 2 to 5 at the end of the table.

Synthesis of Exemplary Impact Modifier I1

Under nitrogen atmosphere, 5687 g of Acclaim® 4200 polyol (Bayer MaterialScience) 712 g (2 equivalents) of MDI with the trade name Desmodur 44 MC L (Covestro) and 0.6 g catalyst DABCO 33 LV (Air Products) were heated with constant stirring to 80° C. and left at this temperature to produce an NCO-terminated prepolymer. After one hour of reaction time, a free NCO content was determined by titration. It had reached a content of isocyanate groups of 1.9 wt.-%. Subsequently, 910 g cardanol with the trade name Cardolite NC-700 (Cardolite) were added and stirring was continued for a further 2 hours at 80° C. The reaction was stopped as soon as free isocyanate was no longer detectable by IR spectroscopy (wavenumbers 2275-2230 cm$^{-1}$).

Synthesis of Exemplary Impact Modifier I2

150 g of isocyanate-terminated prepolymer, produced from 60% by weight PolyTHF® 2000 (BASF), 40% by weight Poly BD® R45V (Cray Calley), Isophorone diisocyanate (Evonik) (0.75 equivalents) and dibutyl tin dilaurate catalyst, was treated with 1 equivalent of dry Epikote® 828LVEL (Hexion). Next, 8.11 mmol phthalic anhydride (Sigma Aldrich) were added, the reaction mixture was mixed and then reacted at 110° C. under vacuum by adding catalyst.

Synthesis of Exemplary Impact Modifier I3

Impact modifier I3 was synthesized in identical manner as described for impact modifier I1, with the sole exception that an equimolar amount of IPDI was used instead of MDI.

Synthesis of Exemplary Impact Modifier I4

Impact modifier I4 was synthesized in identical manner as described for impact modifier I3, with the exceptions that as polyol two equivalents of a mixture of 60% by weight PolyTHF® 2000 (BASF) and 40% by weight Poly BD® R45V (Cray Calley) was used instead of Acclaim® 4200 and an equimolar amount of IPDI was used instead of MDI.

Synthesis of Exemplary Impact Modifier I5

Impact modifier I5 was synthesized in identical manner as described for impact modifier I1, with the sole exception that as polyol two equivalents of a mixture of 60% by weight PolyTHF® 2000 (BASF) and 40% by weight Poly BD® R45V (Cray Calley) was used instead of Acclaim® 4200.

TABLE 2

Details of compositions C1 and C2.

| | C1 (Ref.) | C2 |
|---|---|---|
| Component K1 | | |
| BADGE | 63 | 63 |
| Impact modifier I1 | — | 20 |
| Impact modifier I2 | 20 | — |
| Silane A-187 | 1 | 1 |
| Araldite DY-D | 6 | 6 |
| Silica | 5 | 5 |
| Chalk | 5 | 5 |
| TOTAL | 100 | 100 |
| Component K2 | WTG-1280 (B) - mixing ratio (w/w) 100:70 (K1:K2) | |
| Test data | | |
| E-Mod [MPa] | 2990 | 2390 |
| IPS [N/mm] | 19.3 | 26.4 |

TABLE 3

Details of compositions C3 to C6.

| | C3 (Ref.) | C4 | C5 | C6 (Ref.) |
|---|---|---|---|---|
| Component K1 | | | | |
| BADGE | 63 | 63 | 68 | 83 |
| Impact modifier I1 | — | 20 | 15 | — |
| Impact modifier I2 | 20 | — | — | — |
| Silane A-187 | 1 | 1 | 1 | 1 |
| Araldite DY-D | 6 | 6 | 6 | 6 |
| Silica | 5 | 5 | 5 | 5 |
| Chalk | 5 | 5 | 5 | 5 |
| TOTAL | 100 | 100 | 100 | 100 |
| Component K2 | WTG-1050 (B) - mixing ratio (w/w) 100:47 (K1:K2) | | | |
| Test data | | | | |
| E-Mod [MPa] | 3140 | 2290 | 2680 | 3930 |
| IPS [N/mm] | 21.2 | 27.2 | 21.8 | 0.3 |
| Viscosity [Pa s] | 89.5 | 62.03 | 55.3 | 41.3 |

TABLE 4

Details of compositions C7 to C10.

| | C7 | C8 (Ref.) | C9 (Ref.) | C10 (Ref.) |
|---|---|---|---|---|
| Component K1 | | | | |
| BADGE | 68 | 68 | 68 | 68 |
| Impact modifier I1 | 14 | — | — | — |
| Desmocap 11 | — | 14 | — | — |
| Desmocap 12 | — | — | 14 | — |
| Desmocap 14 | — | — | — | 14 |
| Araldite DY-D | 6 | 6 | 6 | 6 |
| Silane A-187 | 1 | 1 | 1 | 1 |
| Silica | 5 | 5 | 5 | 5 |
| Chalk | 6 | 6 | 6 | 6 |
| TOTAL | 100 | 100 | 100 | 100 |
| Component K2 | WTG-1280 (B) - mixing ratio (w/w) 100:70 (K1:K2) | | | |
| Test data | | | | |
| IPS [N/mm] | 14.2 ± 0.5 | 3.1 ± 0.1 | 7.4 ± 0.7 | 2.0 ± 1.4 |
| TS [MPa] | 37.9 ± 1.5 | 45.4 ± 1.4 | 47.1 ± 0.5 | 39.2 ± 12.5 |
| EOB [%] | 4.1 ± 1.6 | 3.4 ± 1.3 | 3.9 ± 0.5 | 2.6 ± 1.1 |
| E-Mod [MPa] | 2180 ± 70 | 3030 ± 70 | 3210 ± 70 | 3070 ± 210 |

TABLE 5

Details of compositions C11 to C14.

| | C11 | C12 | C13 | C14 |
|---|---|---|---|---|
| Component K1 | | | | |
| BADGE | 68 | 68 | 68 | 68 |
| Impact modifier I1 | 14 | — | — | — |
| Impact modifier I3 | — | 14 | — | — |
| Impact modifier I4 | — | — | 14 | — |
| Impact modifier I5 | — | — | — | 14 |
| Silane A-187 | 1 | 1 | 1 | 1 |
| Araldite DY-D | 6 | 6 | 6 | 6 |
| Silica | 7 | 7 | 7 | 7 |
| Chalk | 4 | 4 | 4 | 4 |
| TOTAL | 100 | 100 | 100 | 100 |
| Component K2 | WTG-1050 (B) - mixing ratio (w/w) 100:47 (K1:K2) | | | |
| Test data | | | | |
| E-Mod [MPa] | 2910 | 3070 | 3280 | 3490 |
| IPS [N/mm] | 17.0 | 11.0 | 5.2 | 8.2 |

The invention claimed is:

1. A two-component epoxy resin composition, comprising a first component K1 comprising at least one epoxy resin A that contains on average more than one epoxy group per molecule; and
a second component K2 comprising a hardener B for epoxy resins;
wherein the two-component epoxy resin composition contains between 2 and 35 wt.-%, based on the total weight of the composition, of at least one impact modifier I in either one or both of components K1 and K2;
wherein the impact modifier I is a reaction product of at least one polymeric diol selected from the group consisting of polyoxypropylenediol and polyoxyethylene-polyoxypropylene copolymer diol, at least one polyisocyanate selected from the group consisting of to 4,4'-diphenylmethane diisocyanate, 2,4'-diphenylmethane diisocyanate, 2,2'-diphenylmethane diisocyanate and arbitrary mixtures thereof, and cardanol.

2. The two-component epoxy resin composition according to claim 1, wherein the polymeric diol has an average molecular weight $M_n$, measured by GPC against polystyrene standard, of between 300 and 15,000 g/mol.

3. The two-component epoxy resin composition according to claim 1, wherein the impact modifier I has an apparent epoxy equivalent weight of >500 g/eq.

4. The two-component epoxy resin composition according to claim 1, wherein the two-component epoxy resin composition contains the epoxy resin A with an amount of between 5 and 85 wt.-%, based on the total weight of the composition.

5. The two-component epoxy resin composition according to claim 1, wherein the two-component epoxy resin composition contains the hardener B with an amount of between 5 and 40 wt.-%, based on the total weight of the composition.

6. The two-component epoxy resin composition according to claim 1, wherein the two-component epoxy resin composition contains at least one filler with an amount of between 20 and 50 wt.-%, based on the total weight of the composition.

7. The two-component epoxy resin composition according to claim 1, wherein the hardener B comprises di- and/or tri-functional polyamines.

8. The two-component epoxy resin composition according to claim 1, wherein the two-component epoxy resin composition comprising:
the first component K1, comprising between 25 and 85 wt.-%, based on component K1, of the at least one epoxy resin A, and between 0 and 15 wt.-%, based on component K1, of at least one epoxy-functional reactive diluent, and between 0 and 25 wt.-%, based on component K1, of at least one filler, and between 5 and 25 wt.-%, based on component K1, of the impact modifier I;
the second component K2, comprising between 30 and 70 wt.-%, based on component K2, of the hardener B for epoxy resins, and between 25 and 75 wt.-%, based on component K2, of at least one filler, and between 0.5 and 7 wt.-%, based on component K2, of at least one accelerator for the curing of epoxy resins.

9. A method of manufacturing a two-component epoxy resin composition, the method comprising:
introducing a reaction product of at least one polymeric diol selected from the group consisting of polyoxypropylenediol and polyoxyethylene-polyoxypropylene copolymer diol, at least one polyisocyanate selected from the group consisting of to 4,4'-diphenylmethane diisocyanate, 2,4'-diphenylmethane diisocyanate, 2,2'-diphenylmethane diisocyanate and arbitrary mixtures thereof, and cardanol as an impact modifier or a toughener into a two-component epoxy resin composition, wherein
two-component epoxy resin composition comprises a first component K1 comprising at least one epoxy resin A that contains on average more than one epoxy group per molecule, and a second component K2 comprising a hardener B for epoxy resins.

10. The method according to claim 9, wherein the polymeric diol has an average molecular weight $M_n$, measured by GPC against polystyrene standard, of between 300 and 15,000 g/mol.

11. An adhesively bonded article, wherein the adhesive for the adhesive bond is the two-component epoxy resin composition according to claim 1.

* * * * *